US012730837B2

(12) United States Patent
Wu et al.

(10) Patent No.: US 12,730,837 B2
(45) Date of Patent: Sep. 8, 2026

(54) DYNAMIC ACOUSTIC SIGNATURE SYSTEM WITH SENSOR FUSION FOR ILLEGAL LOGGING IN RAINFOREST

(71) Applicant: HITACHI VANTARA LLC, Santa Clara, CA (US)

(72) Inventors: Jiayi Wu, Winchester, MA (US); Mauro A. Damo, Windermere, FL (US); Fnu Ain-Ul-Aisha, Framingham, MA (US); Wei Lin, Plainsboro, NJ (US); William Schmarzo, Palo Alto, CA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 632 days.

(21) Appl. No.: 18/266,162

(22) PCT Filed: Dec. 30, 2020

(86) PCT No.: PCT/US2020/067556

§ 371 (c)(1),
(2) Date: Jun. 8, 2023

(87) PCT Pub. No.: WO2022/146434

PCT Pub. Date: Jul. 7, 2022

(65) Prior Publication Data

US 2024/0054154 A1 Feb. 15, 2024

(51) Int. Cl.
*G06F 16/487* (2019.01)
*G06F 16/435* (2019.01)
(Continued)

(52) U.S. Cl.
CPC .......... *G06F 16/487* (2019.01); *G06F 16/435* (2019.01); *G06N 7/01* (2023.01); *G06N 20/00* (2019.01); *G06V 20/188* (2022.01)

(58) Field of Classification Search
CPC ....... G06F 16/487; G06F 16/435; G06N 7/01; G06N 20/00; G06N 3/0895; G06N 3/09;
(Continued)

(56) References Cited

U.S. PATENT DOCUMENTS

2008/0094212 A1 4/2008 Breed
2011/0169664 A1 7/2011 Berger et al.
2018/0332418 A1 11/2018 Jones et al.

OTHER PUBLICATIONS

Van Stokkom An Innovative Early Warning System to Tackle Illegal Deforestation, pp. 1-15, (May 2020).*
(Continued)

*Primary Examiner* — Albert M Phillips, III
(74) *Attorney, Agent, or Firm* — PROCOPIO, CORY, HARGREAVES & SAVITCH LLP

(57) ABSTRACT

Example implementations described herein can be directed to detecting a human disturbance from sensor data streamed from one or more sensors in a network of sensors; processing the detected human disturbance to determine a probability of a chainsaw event (e.g., light chainsaw or dense chainsaw event) and an estimated lead time for the chainsaw event for an area associated with the one or more sensors; and determining, for neighboring sensors to the one or more sensors in the network of sensors, a probability of a change of state to the human disturbance or the chainsaw event for other areas associated with the neighboring sensors.

11 Claims, 20 Drawing Sheets

(51) Int. Cl.
*G06N 7/01* (2023.01)
*G06N 20/00* (2019.01)
*G06V 20/10* (2022.01)

(58) Field of Classification Search
CPC ...... G06N 3/094; G06N 3/0985; G06N 3/045; G06V 20/188; G06Q 10/06; G06Q 10/063; G06Q 10/08; G06Q 30/018; G06Q 50/02; G06Q 50/26
See application file for complete search history.

(56) References Cited

OTHER PUBLICATIONS

Mporas, Illegal Logging Detection Based on Acoustic Surveillance of Forest, pp. 1-12, (Oct. 21, 2020).*

Arevalo, Towards Real-time Illegal Logging Monitoring: Gas-powered Chainsaw Logging Detection System using K-Nearest Neighbors, pp. 156-160, (Nov. 2020).*

U.S. Patent & Trademark Office/Patent Cooperation Treaty. PCT International Search Report and Written Opinion Mailed Mar. 23, 2021. International Application No. PCT/US2020/067556. Name of Applicant: Hitachi Vantara LLC. English Language. 7 pages.

* cited by examiner

DYNAMIC ACOUSTIC SIGNATURE SYSTEM WITH SENSOR FUSION FOR ILLEGAL LOGGING IN RAINFOREST

BACKGROUND

Field

The present disclosure is generally directed to Internet of Things (IoT) systems, and more specifically, to IoT systems facilitating dynamic acoustic signature recognition.

Related Art

Illegal logging is the harvesting of wood that is in violation of national regulations. The environmental effects of illegal logging include deforestation, the loss of biodiversity, and the emission of greenhouse gases.

The massive size of the rainforest habitat increases the difficulty of locating illegal loggers. Even with several acoustic sensors collecting data, environmental noise and compound animal sounds make the rainforest more challenging to analyze.

SUMMARY

Emerging IoT technology, advanced machine learning systems, and algorithms have been developed and applied to prevent illegal logging. However, there are significant limitations in the related art implementations.

One limitation is the insufficiency of acoustic labels. Related art systems rely on accurate label and sensor data which is difficult to derive for several reasons. First, the manual labeling process can create relatively accurate labels, but that process consumes significant human resources. Second, historical records may not be able to cover all scenarios. Third, new anomalous events cannot be identified or prevented if there is insufficient data.

Another problem of the related art includes the lack of prevention prediction. Related art approaches only detect illegal loggings when they are happening. When rangers discover the cutting fields, illegal loggers have already left. In other words, there is no preventative action. Different predicted labels lack temporal relationship and causation. The mechanism to associate labels and lead time are predetermined/pre-calculated, and therefore cannot be updated by new information.

Furthermore, reliability of the related art model highly depends on data completeness and sensor uptime. Missing data or sensor failure always degrades model performance or prohibits model execution. The existing model lacks fault tolerance and cannot identify the root cause or false negative records after deployment. Due to environmental constraints, sensor-based data may present environmental noise differently which interferes with deployed, pre-learned patterns.

To address the aforementioned problems, example implementations described herein are directed to a media signature system to label acoustic signals or images by fused sensors across guardians, identify antecedent indicators of illegal loggings, and predict logger traverse patterns to prevent illegal loggings before they occur.

Example implementations address label availability by using a dynamic fingerprint system. By extracting maximum information from single channel acoustic files or images in real-time, the system creates labels with acoustic signals only. Sensor availability is solved through the use of synthesized data which combines anomalous signals and background signals with adjusted power levels and modified harmonics.

Further, example implementations described herein identify signal fingerprints in multi-source complex and continuous background noise. The media fingerprint identifies the temporal pattern of acoustic signals or images based on their perceptual characteristics from a single channel. Example implementations described herein incorporate event association between anomalies and their sequence, thereby identifying antecedent indicators of specific anomalous acoustic signals or images. As a result, the example implementations can generate actionable alerts by using antecedent indicators to potential anomalous signals.

Lastly, the example implementations predict an anomalous footprint which considers sensor data and/or known properties of the whole environment. The media footprint identifies the traverse pattern which considers environmental and geographical information across all channels. It integrates information across sensors via a sensor fusion approach to create fault tolerance models to address the rainforest environment. Sensor fusion is the combining and aggregating of sensory data or data derived from sensory data such that the resulting information is better than using the data individually. Because sensor fusion uses environmental contextual information as well as human and sensor inputs as a priori knowledge and current state, it can improve analytics algorithms with fault tolerance and not rely on a specific sensor or a group of sensors to determine the analytics outcome. This approach also improves labeling results by building a self-feedback, error-learning system with limited human intervention.

Thus, the example implementations can thereby address the limitations of the related art and can dynamically predict acoustic signatures with sensor fusion.

Aspects of the present disclosure involve a method that can include identifying and labeling patterns based on characteristics of sensor data streamed from one or more sensors in a network of sensors; processing the identified and labeled patterns to determine a probability of a chainsaw event and an estimated lead time for the chainsaw event for an area associated with the one or more sensors; and determining, for neighboring sensors to the one or more sensors in the network of sensors, a probability of a state change to a human disturbance or the chainsaw event for other areas associated with the neighboring sensors.

Aspects of the present disclosure involve a computer program that stores instructions that can include identifying and labeling patterns based on characteristics of sensor data streamed from one or more sensors in a network of sensors; processing the identified and labeled patterns to determine a probability of a chainsaw event and an estimated lead time for the chainsaw event for an area associated with the one or more sensors; and determining, for neighboring sensors to the one or more sensors in the network of sensors, a probability of a state change to a human disturbance or the chainsaw event for other areas associated with the neighboring sensors. The instructions can be stored in a non-transitory computer readable medium and configured to be executed by one or more processors.

Aspects of the present disclosure involve a system that can include means for identifying and labeling patterns based on characteristics of sensor data streamed from one or more sensors in a network of sensors; means for processing the identified and labeled patterns to determine a probability of a chainsaw event and an estimated lead time for the chainsaw event for an area associated with the one or more sensors; and means for determining, for neighboring sensors to the one or more sensors in the network of sensors, a probability of a state change to a human disturbance or the chainsaw event for other areas associated with the neighboring sensors.

Aspects of the present disclosure involve an apparatus, involving a processor configured to identify and label patterns based on characteristics of sensor data streamed from one or more sensors in a network of sensors; process the identified and labeled patterns to determine a probability of a chainsaw event and an estimated lead time for the chainsaw event for an area associated with the one or more sensors; and determine, for neighboring sensors to the one or more sensors in the network of sensors, a probability of a state change to a human disturbance or the chainsaw event for other areas associated with the neighboring sensors.

Aspects of the present disclosure can involve a method that can include detecting a first event from sensor data streamed from one or more sensors in a network of sensors; processing the first event to determine a probability of a second event and an estimated lead time for the second event for an area associated with the one or more sensors; and determining, for neighboring sensors to the one or more sensors in the network of sensors, a probability of a change of state to the first event or the second event for other areas associated with the neighboring sensors.

Aspects of the present disclosure can involve a computer program having instructions that can include detecting a first event from sensor data streamed from one or more sensors in a network of sensors; processing the first event to determine a probability of a second event and an estimated lead time for the second event for an area associated with the one or more sensors; and determining, for neighboring sensors to the one or more sensors in the network of sensors, a probability of a change of state to the first event or the second event for other areas associated with the neighboring sensors. The instructions can be stored in a non-transitory computer readable medium and executed by one or more processors.

Aspects of the present disclosure can involve a system that can include means for detecting a first event from sensor data streamed from one or more sensors in a network of sensors; means for processing the first event to determine a probability of a second event and an estimated lead time for the second event for an area associated with the one or more sensors; and means for determining, for neighboring sensors to the one or more sensors in the network of sensors, a probability of a change of state to the first event or the second event for other areas associated with the neighboring sensors.

Aspects of the present disclosure can involve an apparatus that can include a processor, configured to detect a first event from sensor data streamed from one or more sensors in a network of sensors; process the first event to determine a probability of a second event and an estimated lead time for the second event for an area associated with the one or more sensors; and determine, for neighboring sensors to the one or more sensors in the network of sensors, a probability of a change of state to the first event or the second event for other areas associated with the neighboring sensors.

Aspects of the present disclosure can involve a method, which can include identifying and labeling patterns based on characteristics of sensor data streamed from one or more sensors in a network of sensors; processing the identified and labeled patterns to estimate a probability and a lead time for a change to an area associated with the one or more sensors from a current sensor stage to another sensor stage, the processing the identified and labeled patterns including a sequential error learning process configured to improve accuracy; and determining, for neighboring sensors to the one or more sensors in the network of sensors, a probability of a sensor stage change for other areas associated with the neighboring sensors.

Aspects of the present disclosure can involve a system, which can include means for identifying and labeling patterns based on characteristics of sensor data streamed from one or more sensors in a network of sensors; means for processing the identified and labeled patterns to estimate a probability and a lead time for a change to an area associated with the one or more sensors from a current sensor stage to another sensor stage, the means for processing the identified and labeled patterns involving a sequential error learning process configured to improve accuracy; and means for determining, for neighboring sensors to the one or more sensors in the network of sensors, a probability of a sensor stage change for other areas associated with the neighboring sensors.

Aspects of the present disclosure can involve a computer program, which can involve instructions that can include identifying and labeling patterns based on characteristics of sensor data streamed from one or more sensors in a network of sensors; processing the identified and labeled patterns to estimate a probability and a lead time for a change to an area associated with the one or more sensors from a current sensor stage to another sensor stage, the processing the identified and labeled patterns including a sequential error learning process configured to improve accuracy; and determining, for neighboring sensors to the one or more sensors in the network of sensors, a probability of a sensor stage change for other areas associated with the neighboring sensors. The instructions can be stored on a non-transitory computer readable medium and executed by one or more processors.

Aspects of the present disclosure can involve an apparatus, which can include a processor configured to identify and label patterns based on characteristics of sensor data streamed from one or more sensors in a network of sensors; process the identified and labeled patterns to estimate a probability and a lead time for a change to an area associated with the one or more sensors from a current sensor stage to another sensor stage, the processing the identified and labeled patterns including a sequential error learning process configured to improve accuracy; and determine, for neighboring sensors to the one or more sensors in the network of sensors, a probability of a sensor stage change for other areas associated with the neighboring sensors.

DETAILED DESCRIPTION

Figure 1:
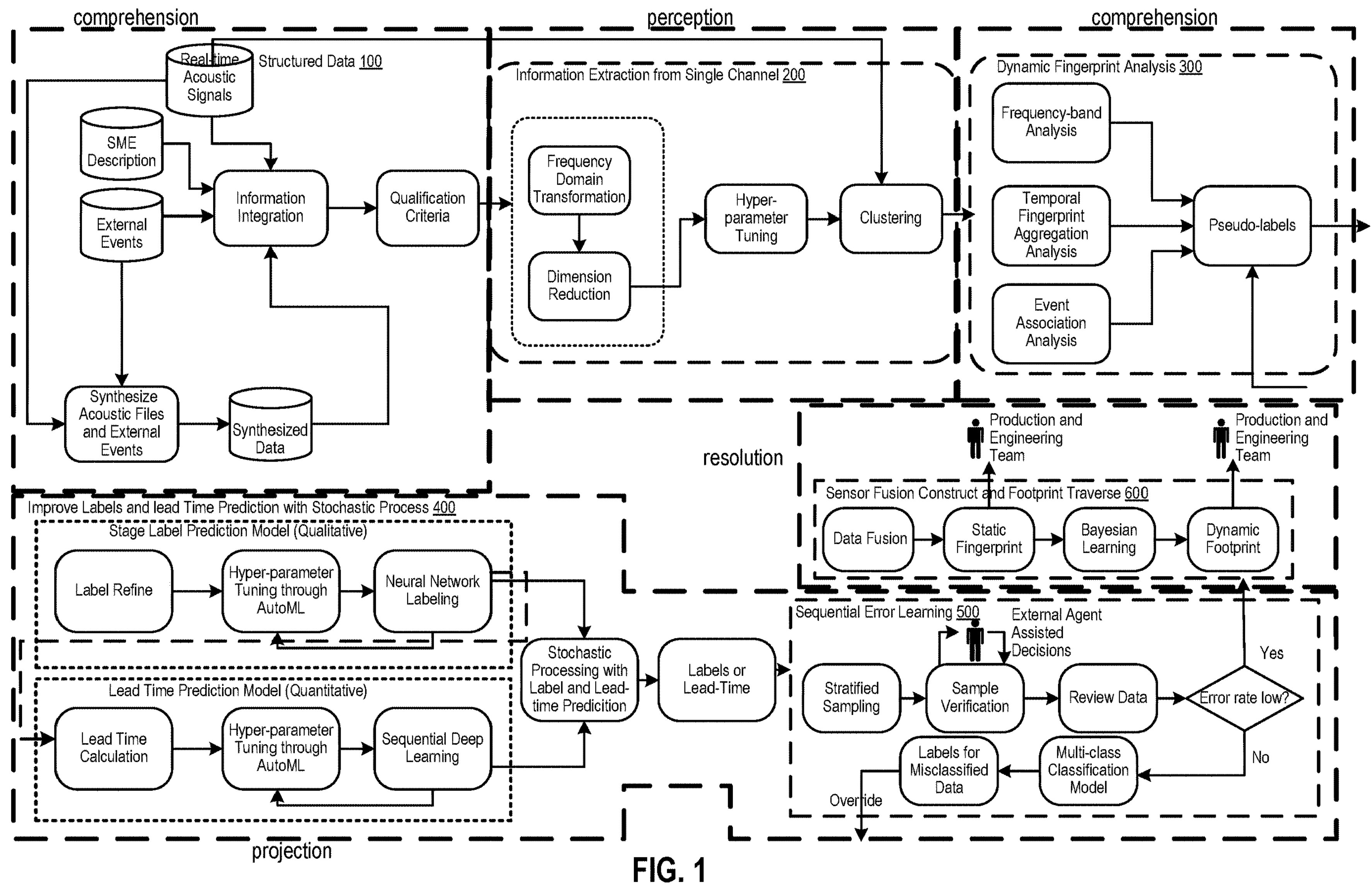
FIG. 1 illustrates an example of an overall system implementing information fusion, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 illustrates an example of an overall system implementing information fusion, in accordance with an example implementation. The system can involve the following aspects.

Structured Data and Synthesized Data 100 is a component that integrates information and assess qualifications, and stores filtered data in a centered database. Further details of this component are described with respect to FIGS. 2-5. Information Extraction from Single Channel 200 is a component that clusters acoustic signals from single channel. Further details of this component are provided with respect to FIGS. 6-7. Dynamic Fingerprint Analysis 300 is a component that identifies the temporal pattern of acoustic signals or images and creates pseudo-labels. Further details of this component are described with respect to FIGS. 8-12. Labels and Lead Time Incorporation with Stochastic Process 400 is a component that refines labels/lead-time and build a stochastic process to learn the pattern. Further details of this component are described with respect to FIGS. 13-14. Sequential Error Learning 500 is a component that enhances labeling results by creating a self-feedback loop with human-reviewed samples. Further details of this component are described with respect to FIG. 15. Sensor Fusion Construct and Footprint Traverse 600 is a component that predicts anomalous footprints by considering sensor data and/or known properties of the whole environment. Further details of this component are provided with respect to FIGS. 16-18.

Four functions of information fusion are illustrated in FIG. 1, which include Comprehension (synthesize and interpret information), Perception (identify and detect information), Projection (predict and simulate information), and resolution (make decisions and plans based on information).

Figure 2:
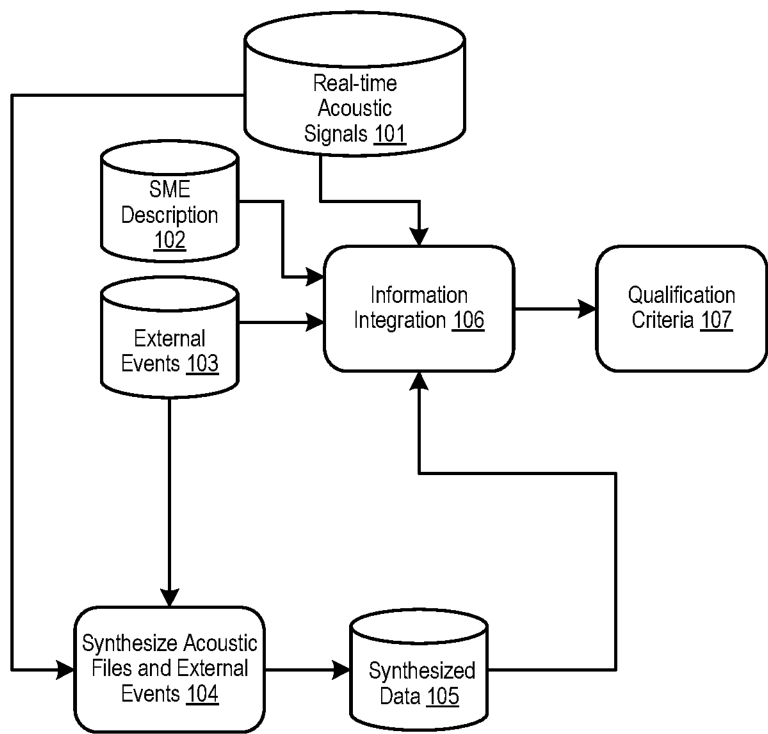
FIG. 2 illustrates an example of structured data and synthesized data, in accordance with an example implementation.

FIG. 2 illustrates an example of structured data and synthesized data 100, in accordance with an example implementation. The first stage is to integrate information 106, assess qualifications 107, and store filtered data in a centered database. The workflow is shown in FIG. 2. There are four potential data sources which include real-time acoustic signals 101, Subject Matter Expert (SME) descriptions 102, external events 103, and synthesized data 105.

Figure 3:
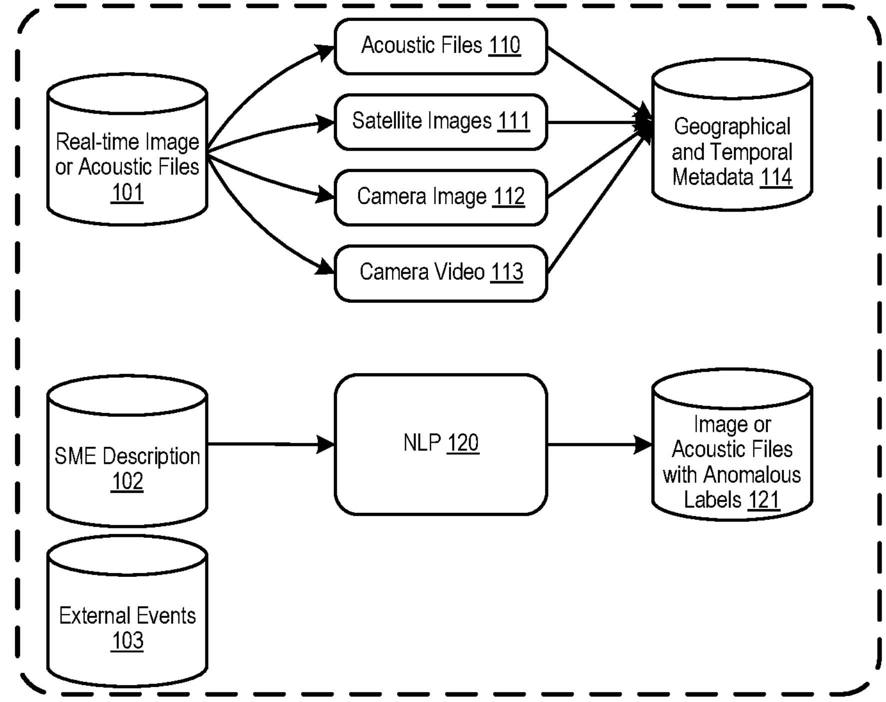
FIG. 3 illustrates an example structuring and processing of information, in accordance with an example implementation.

From various input, information will be structured and processed as in FIG. 3.

In contrast to the related art, this component facilitates several novel aspects, including the utilization of synthesized data to enrich the training dataset, and the assessment of the quality of the acoustic files or images based on compound techniques.

Real-time images or acoustic files 101 include but are not limited to acoustic files 110, satellite images 111, camera images 112, and camera videos 113. Geographical and temporal metadata 114 is extracted and integrated from all data sources. Acoustic signals are collected using devices placed in the rainforest and transferred to a computing cloud via a network. Acoustic signals record sounds from animals, species, humans, and so on, in the rainforest, which involves a spectrum of frequencies ranging from a few Hertz (Hz) to thousands of Hz. To integrate this information, acoustic files 110 need to be sliced and saved in a specified format and frequency. Additionally, satellite images 111, camera images 112, and camera videos 113 are an alternative or accompaniment to acoustic files 110, depending on the desired implementation. Camera video 113 contains both audio and video information which provides more data dimensions. Using alternative data inputs may facilitate the detection of figures and fingerprints more directly.

The SME descriptions 102 are responses from rangers in rainforest guardians. Once a detection model sends out alerts about illegal logging, rangers can step out to validate the illegal logging activities. After their validation in the field, they can describe their findings and respond with evidence. To integrate this information, Natural Language Processing (NLP) 120 is applied and creates anomalous labels with corresponding timestamps 121.

External events 103 are labeled acoustic files in a public dataset or a specific acoustic database. Labels might include "chainsaw", "dog barking", and "vehicle", for example. The usage is explained in synthesized data.

In example implementations, the synthetic data 105 is generated. The purpose of using synthetic data 105 is to enrich the training dataset, especially when the training dataset lacks the examples of the targeted event or when the data is skewed, it can be used to balance the data. Synthesized data is constructed with real-time acoustic signals and external events at 104.

Figure 4:
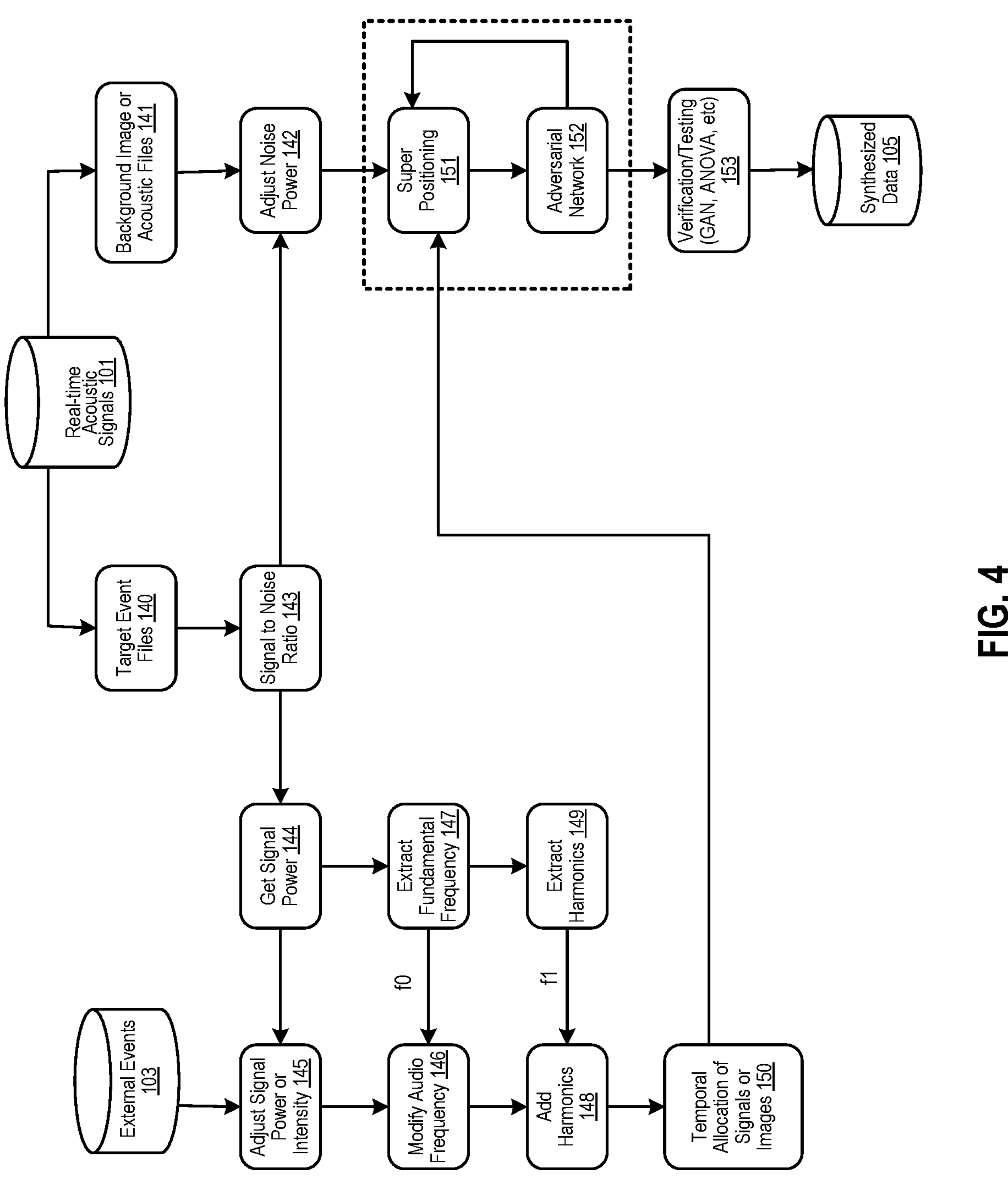
FIG. 4 illustrates an example of synthesizing data with real-time acoustic signals and external events, in accordance with an example implementation.

FIG. 4 illustrates an example of synthesizing data with real-time acoustic signals and external events 103 in accordance with an example implementation. At first, each of the acoustic example is looked at separately. The first example type contains the noise signal 141, which will act as the background noise. The second example type is for the targeted event 140 from the real-time anomalous file and extract the signal specifics. Then, the process uses the extracted information to replicate the presence of the anomalous signal in the desired environment by modifying the signal power levels 145, frequency 146 and the harmonics 148. The process then modifies the signal power levels for the background noise 142 to ensure that the real-time acoustic signal can be mimicked. Then process then combines the anomalous signal 150 and noise signal together by super imposing 151, and then uses the Generative Adversarial Network (GAN) 152 to validate that the synthetic data cannot be differentiated from the real-time data at 153. Once verified, the synthetic data 105 can be kept.

Figure 5:
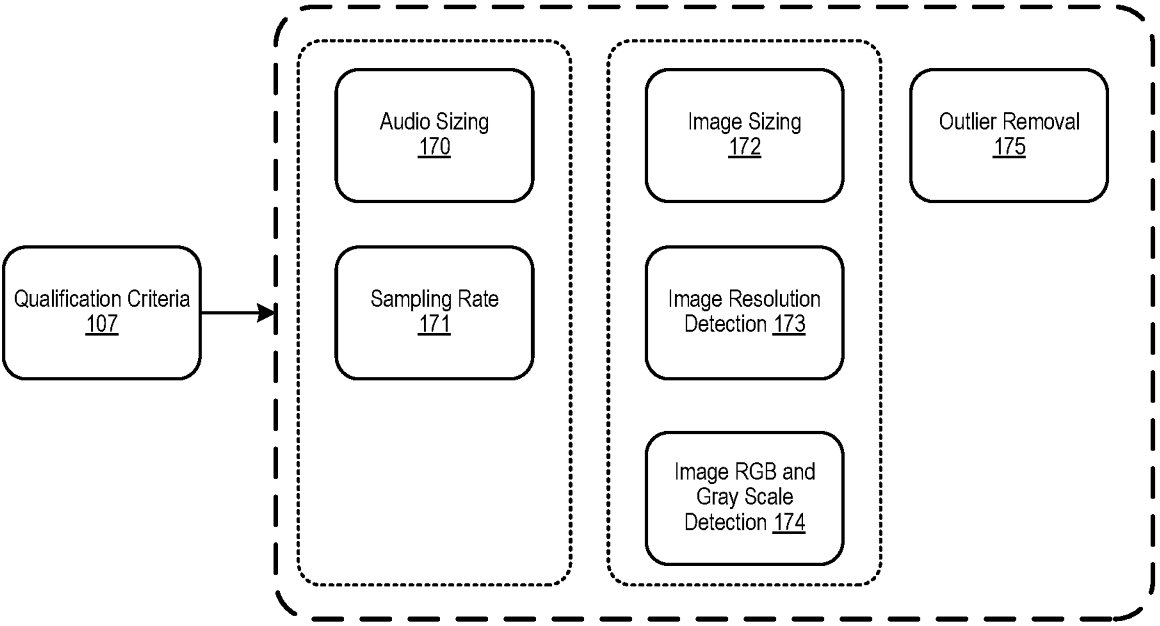
FIG. 5 illustrates an example of the qualification criteria, in accordance with an example implementation.

FIG. 5 illustrates an example of the qualification criteria 107, in accordance with an example implementation. After building centralized data, audio and images need to be assessed and filtered. An evaluation process is required to achieve higher accuracy for future stages. FIG. 5 illustrates a compound approach to select eligible components. Audio sizing 170 and sampling rate 171 will be evaluated for acoustic files while image sizing 172, image resolution 173, and image Red Green Blue (RGB) and gray scale 174 will be detected for images and videos. Based on audio and image detection, outliers will be removed accordingly at 175.

Figure 6:
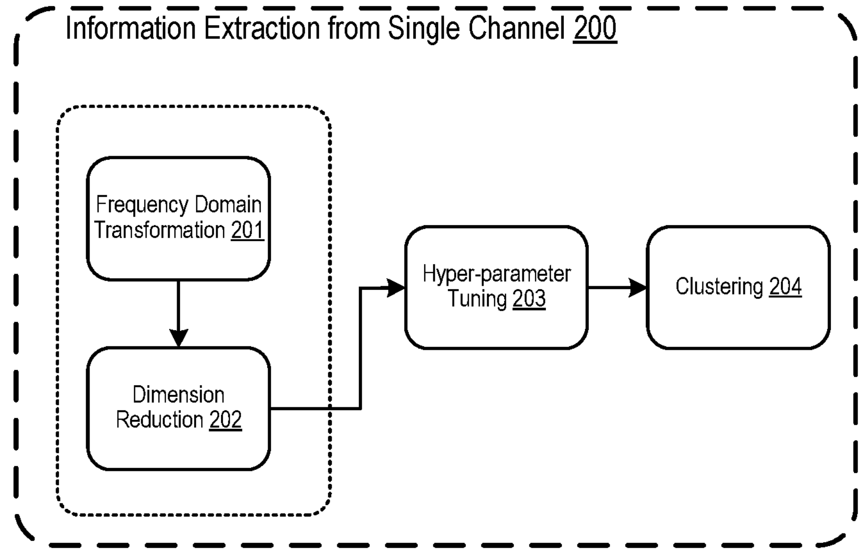
FIG. 6 illustrates an example of the information extraction from the single channel, in accordance with an example implementation.
Figure 7:
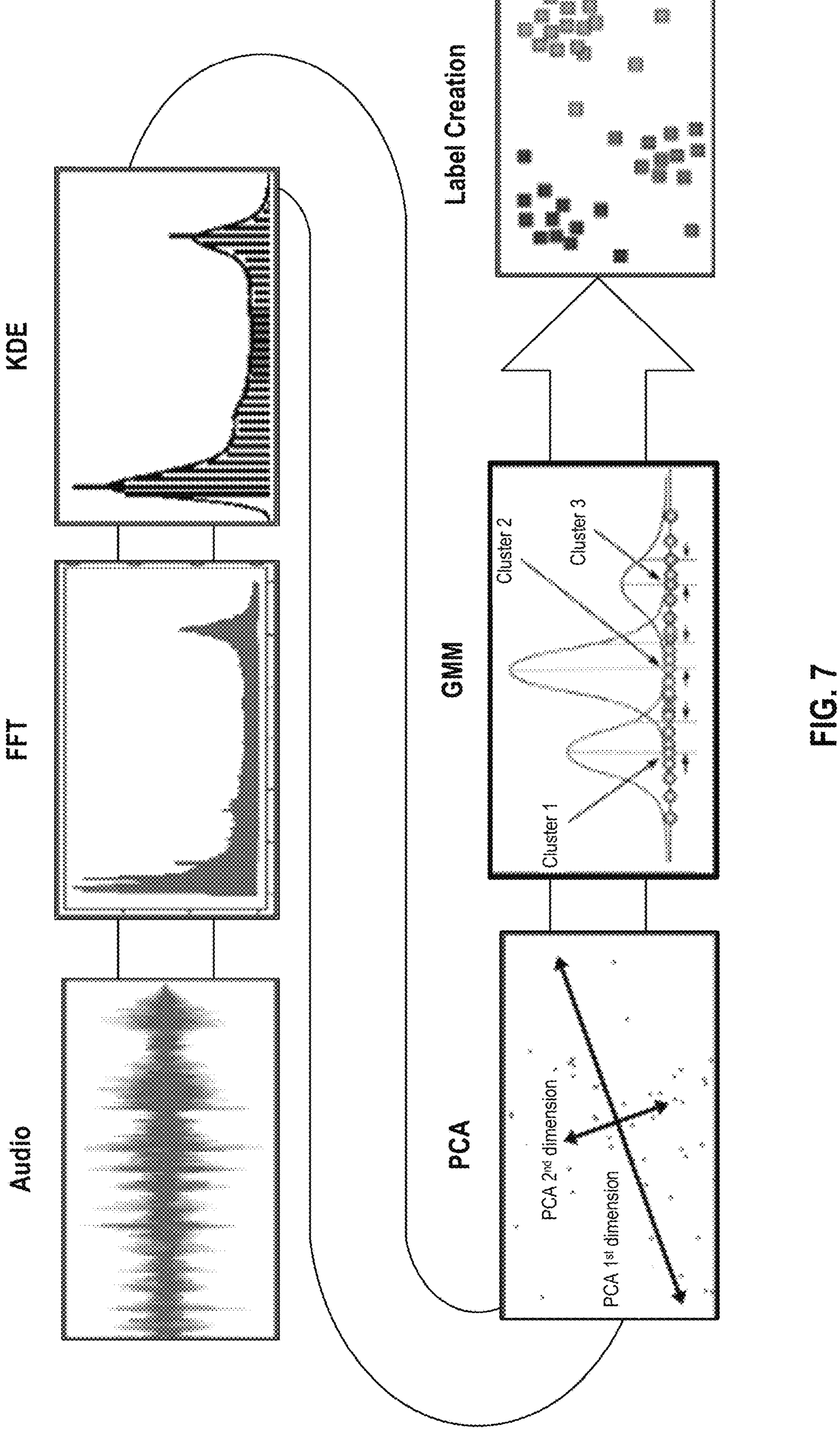
FIG. 7 illustrates an example of clustering acoustic signals from a single channel, in accordance with an example implementation.

FIG. 6 illustrates an example of the information extraction from the single channel, in accordance with an example implementation. The second stage is to cluster acoustic signals from single channel. The workflow of this stage is shown in FIG. 6. FIG. 7 illustrates an example of clustering acoustic signals from a single channel, in accordance with an example implementation.

First, acoustic data is converted from a time domain into a frequency domain at 201. The frequency domain refers to the analytic space in which mathematical functions or signals are conveyed in terms of frequency rather than time. For example, whereas a time-domain graph may display changes over time, a frequency-domain graph displays how much of the signal is present among each given frequency band.

In FIG. 7, Fast Fourier Transform (FFT) is operated, but there are alternatives such as Mel-frequency cepstral coefficients (MFCC), Short Time Fourier Transform (STFT), and so on that can be used in accordance with an example implementation. Instead of using bandwidth from FFT results, Kernel Density Estimation (KDE) is applied to smooth amplitude results from frequency-domain outcomes.

After deriving frequency-domain features, a dimension reduction 202 can be applied to transform data from a high-dimensional space into a low-dimensional space. Acoustic files in a rainforest usually contain sound frequencies in a wide range, from a few Hz (low frequency, e.g. chainsaw, human talking) to thousands of Hz (high frequency, e.g. bird chirping, insect trilling). The low-dimensional representation retains some meaningful properties of the original data, ideally close to its intrinsic dimension.

In FIG. 7, Principle Component Analysis (PCA) is performed and projects original data into fewer dimensions. Other alternatives such as non-negative matrix factorization (NMF), linear discriminant analysis (LDA), can be used in accordance with the desired implementation.

Once features for clustering are defined, hyper-parameter tuning 203 as well as a clustering technique 204 will be conducted to create cluster numbers. Clustering is the task of dividing the population or data points into a number of groups such that data points in the same groups are more similar to other data points in the same group than those in other groups. In other words, the aim is to segregate groups with similar traits and assign them into clusters. With input as frequency-band amplitude, clustering is grouping amplitudes to find similar frequency spectrum and distribution.

In FIG. 7, a Gaussian Mixture Model (GMM) is put to use. GMM is a probabilistic model that assumes all the data points are generated from a mixture of a finite number of Gaussian distributions with unknown parameters. With each Gaussian distribution representing a cluster, the clustering process is to identify the probability of data belonging to each distribution. Thus, the GMM provides soft clustering, while other hard clustering approaches, such as K-means, hierarchical, and density-based spatial clustering can be applied as well in accordance with the desired implementation.

The results from this stage is one cluster number for each data point.

Figure 8:
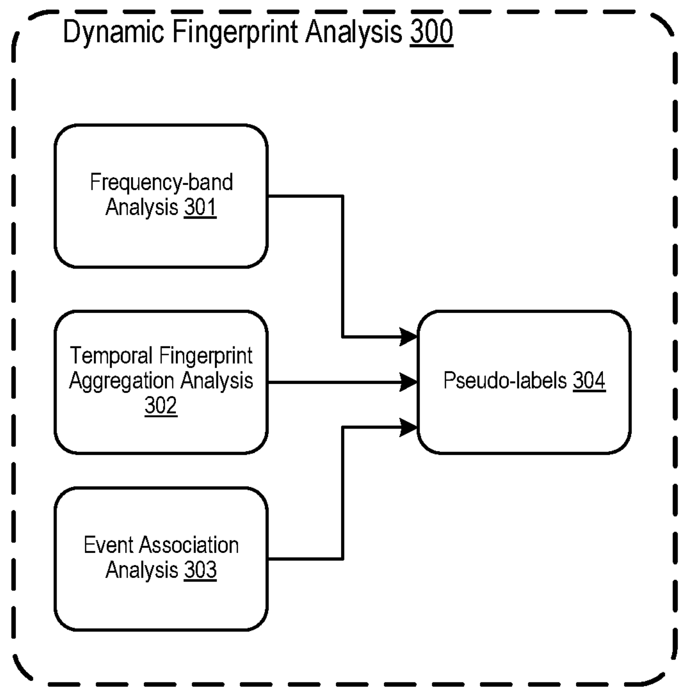
FIG. 8 illustrates dynamic fingerprint analysis, in accordance with an example implementation.

FIG. 8 illustrates dynamic fingerprint analysis 300, in accordance with an example implementation. The third stage is to identify a temporal pattern of acoustic signals or images based on their perceptual characteristics from single channel. In other words, knowing the cluster number is not sufficient to label acoustic signals. Fingerprint analysis from single channel requires considerations in frequency, temporal, and association aspects.

FIG. 8 illustrates the workflow for this stage. In this stage, frequency-band analysis 301, temporal fingerprint aggregation analysis 302, and event association analysis 303 are comprehensively considered to create pseudo-labels 304 for acoustic signals.

Compared to related art implementations, this stage involves several novel aspects. For example, this stage identifies signal fingerprints in multi-source, complex, and continuous background noise and further identifies antecedent indicators for anomalous events. Further, it analyzes the event association between anomalies and their sequence through the frequency band distributions and image classification.

Frequency-band analysis 301 is used to analyze frequency spectrum of cluster centers with underlying sound frequency. A frequency band is an interval in the frequency domain, delimited by a lower frequency and an upper frequency.

With the input from the previous stage, the frequency spectrum of cluster centers can be derived using reversed steps compared to information extraction. Cluster centers, as features format, can be reversed by the dimension reduction model and reconstructed to original frequency domain.

Figure 9:
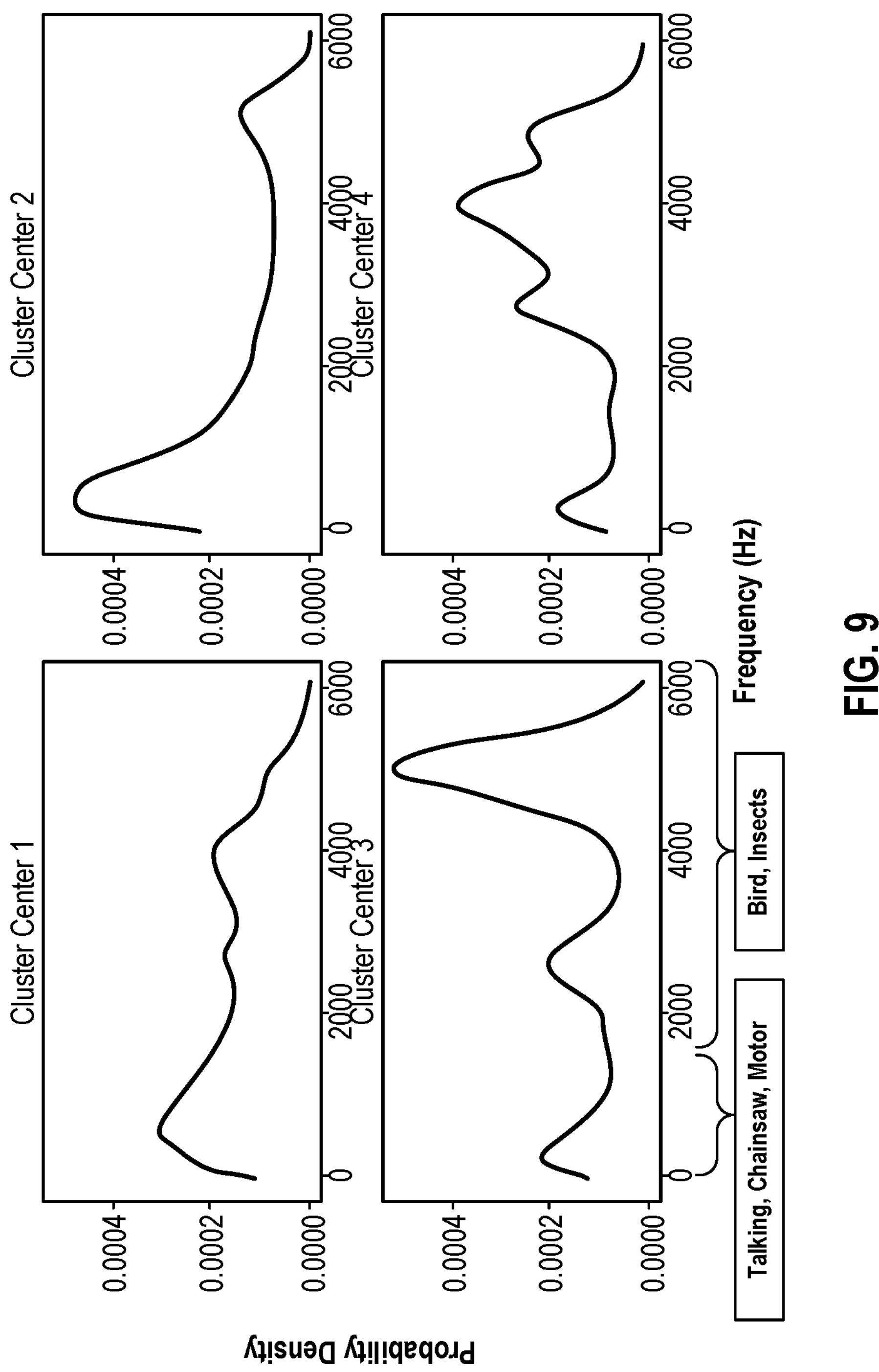
FIG. 9 illustrates an example of deriving the frequency spectrum of cluster centers, in accordance with an example implementation.

FIG. 9 illustrates an example of deriving the frequency spectrum of cluster centers, in accordance with an example implementation. There are four cluster centers being transformed reversely back to frequency domain. X-axis is the frequency ranging from 0 to 6,000 Hz. Y-axis is the probability density considering frequency spectrum as a distribution. Acknowledging low frequency sound (human speech and chainsaw sound) and high frequency sound (bird chirping and insect trilling), labels can be defined in terms of sound composition.

Figure 10:
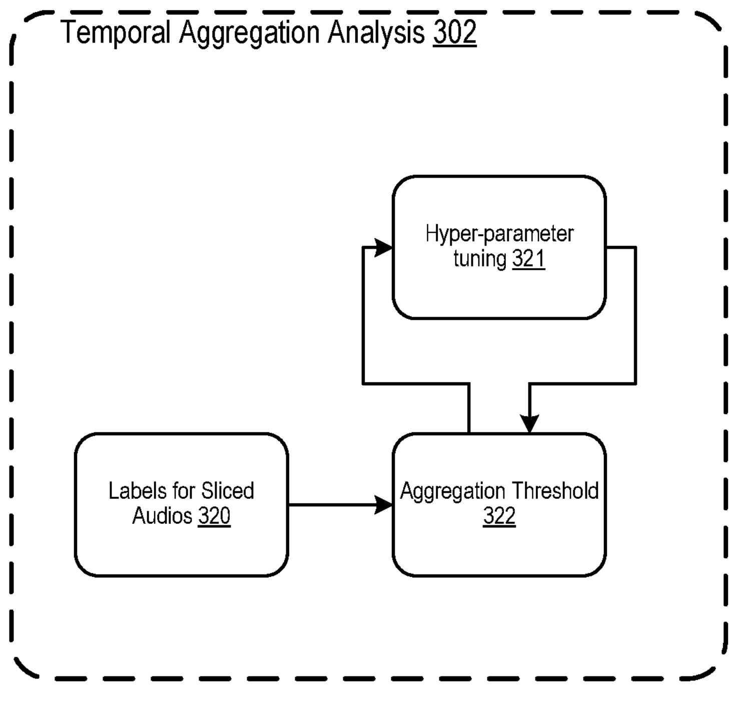
FIG. 10 illustrates the workflow of the temporal fingerprint aggregation analysis, in accordance with an example implementation.

FIG. 10 illustrates the workflow of the temporal fingerprint aggregation analysis 302, in accordance with an example implementation. Temporal fingerprint aggregation analysis is utilized in this stage. To identify a temporal pattern, clusters are connected with timestamps at 320 and are aggregated by different thresholds at 322, which are optimized using hyper-parameter tuning 321.

Figure 11:
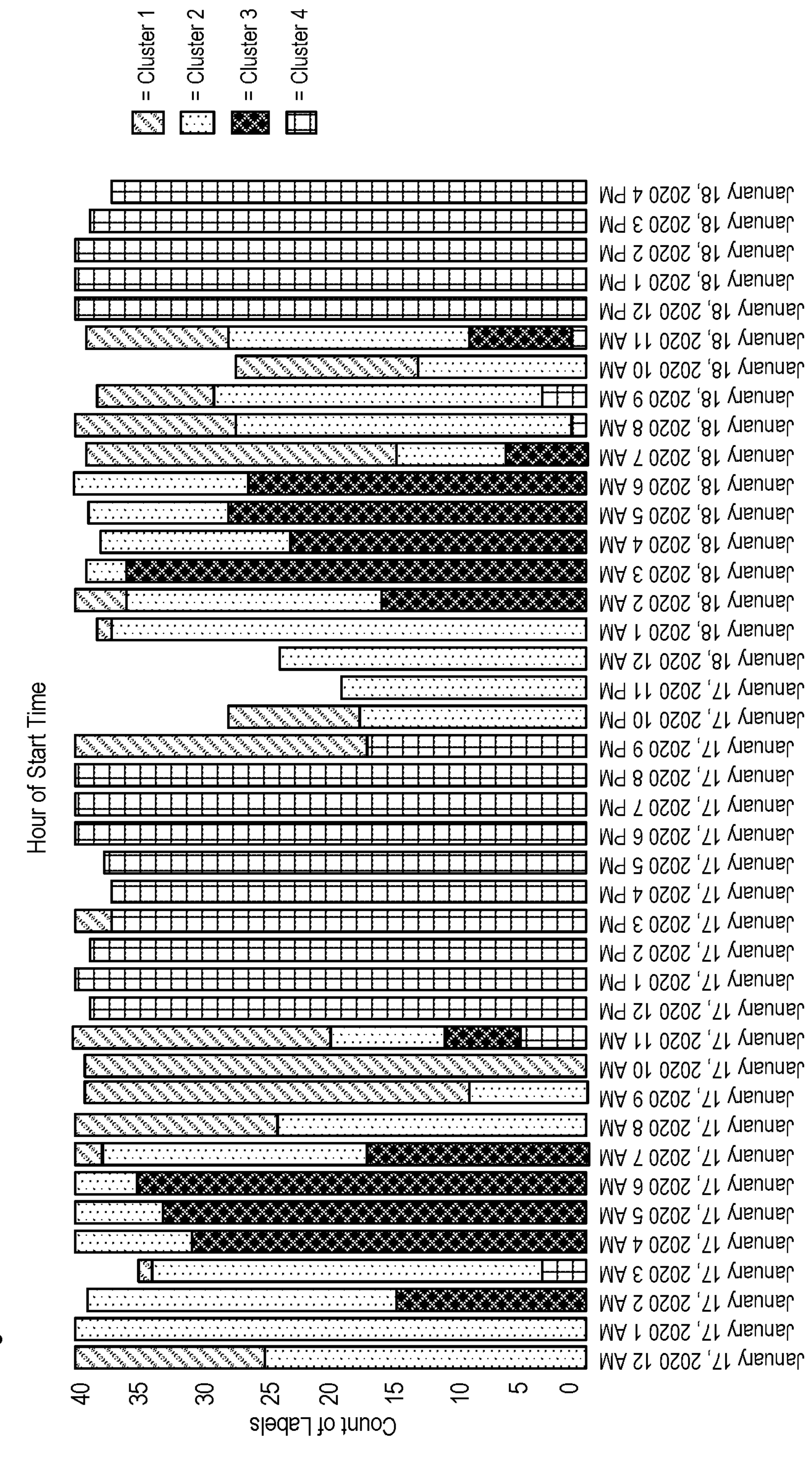
FIG. 11 illustrates an example outcome using UTC time and GMT+7 local time zone, in accordance with an example implementation.

To explain how to use it in practice, FIG. 11 illustrates an example outcome using UTC time and GMT+7 local time zone, in accordance with an example implementation. X-axis represents hours while Y-axis represents count of clusters. Temporal pattern can be inferred that nighttime is dominated by the cluster center 4 while the cluster center 1 shows up before or after the alternating cluster centers 2 and 3 during the day.

Another example implementation in the current stage is event association analysis. This novel step considers event sequence from pre-event to event to post-event, as well as identifies event attributes and class with frequency and temporal information.

In the rainforest use case, the lifecycle of illegal loggings can be described as Original Ecosystem, Human Disturbance, Illegal Loggings, and Disturbed Ecosystem.

With SME descriptions as input, anomalous events can be associated with each cluster. The overlap between anomalous events and predicted clusters will help to understand the relationship between preceding cluster and proceeding cluster.

Figure 12:
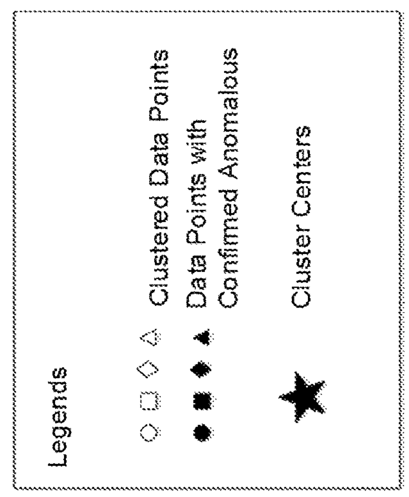
FIG. 12 illustrates an example of the predicted clusters, in accordance with an example implementation.
Figure 12:

FIG. 12 illustrates an example of the predicted clusters, in accordance with an example implementation. Predicted clusters are marked in different shapes including circle, square, diamond and triangle. Considering the anomalous labels from 121 in FIG. 3, the shapes will be filled with black if there is any anomalous extracted from SME description within the signal period. In this example, there are almost no black dots in cluster 1 (shape triangle) and 4 (shape diamond), light in cluster 3 (shape circle) and dense in cluster 2 (shape square). Therefore, cluster 2 represent audio with the most chainsaw sound confirmed by SME, while cluster 3 represent audio with fewer chainsaw sound confirmed by SME.

Moreover, combining information gained from frequency-band analysis and temporal fingerprint aggregation analysis, the following relationships can be derived with the corresponding labels for each cluster:

Cluster 1: human disturbance cluster

Cluster 2: dense chainsaw cluster

Cluster 3: light chainsaw cluster

Cluster 4: quiet time cluster

As a result, pseudo-labels will be generated after this novel stage. The definitions for each cluster can be found here:

Human disturbance cluster identifies audios with human activities which occurs before and after logging activities. It involves human activities like exploring rainforest to find logging candidates or transporting logs out of rainforest. It might consist of sound like human talking, motorcycle, cars, dog barking, etc. Animal sound within such audios is unusual compared to quiet time cluster, due to human disturbance.

Dense chainsaw cluster identifies audios with heavy chainsaw sound. It occurs during logging activities with clear and loud chainsaw sound, occupying most of length in audios. It represents actual logging time when chainsaw sound dominates the audio while animal sound is covered fully. It usually happens at daytime when loggers have a clear vision of rainforest.

Light chainsaw cluster identifies audios with fewer chainsaw sound. It occurs during logging activities, but chainsaw sound only occupies partial audio length. During logging activities, loggers might take a rest or change their tools. Such breaks explain why there are fewer chainsaw sound detected. Light chainsaw labels are usually clustered at daytime when loggers have a clear vision of rainforest.

Quiet time cluster identifies audios with nature sound in the rainforest, including animal sound, insect sound, rain/wind sound, etc. It represents pure environmental sound without human intervention. It can occur during the day or night.

Figure 13:
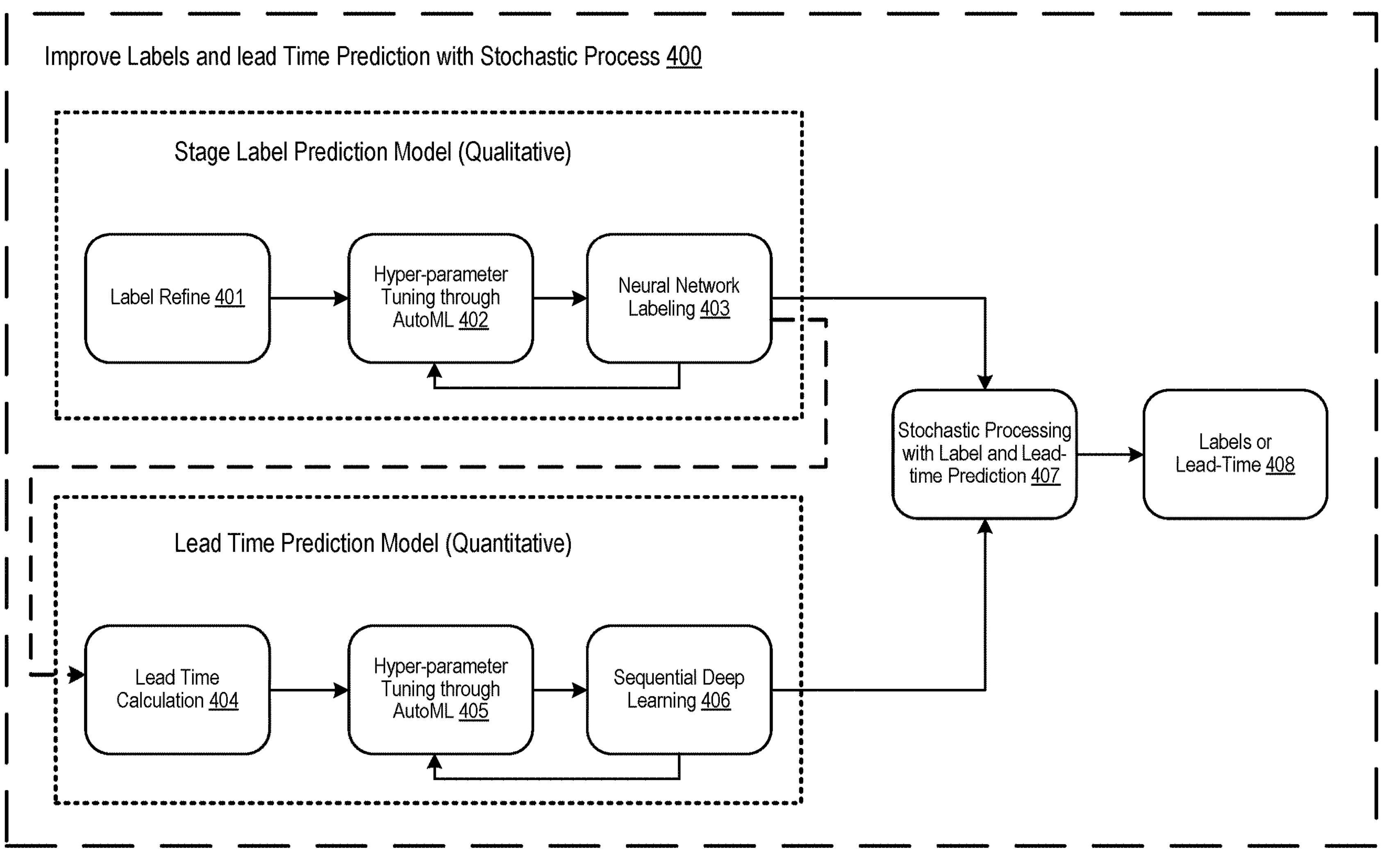
FIG. 13 illustrates an example of labels and lead time incorporation with stochastic process, in accordance with an example implementation.

FIG. 13 illustrates an example of labels and lead time incorporation with stochastic process 400, in accordance with an example implementation. The fourth stage is to refine labels/lead-time and build a stochastic process to learn the pattern. Lead time is defined as the amount of time that passes from one label to the next. Due to temporal characteristics of labels, the lead time can be calculated between different labels or same labels.

FIG. 13 illustrates an example of the stage workflow. With pseudo-labels as input, labels can be refined at 401 and lead time can be calculated at 404. Two neural network models can be generated (e.g., neural network labeling 403 and sequential deep learning 406), and accuracy can be improved through hyper-parameter tuning 402 and 405. After learning the pattern and obtaining prediction results, a stochastic process can be created combining predicted labels and lead time at 407 and the process can be configured to output labels or lead time 408 accordingly.

Compared to the related art, this stage is novel because it builds a multi-output process to incorporate both label and lead time, and it improves model robustness and resilience by neural network models.

Figure 14:
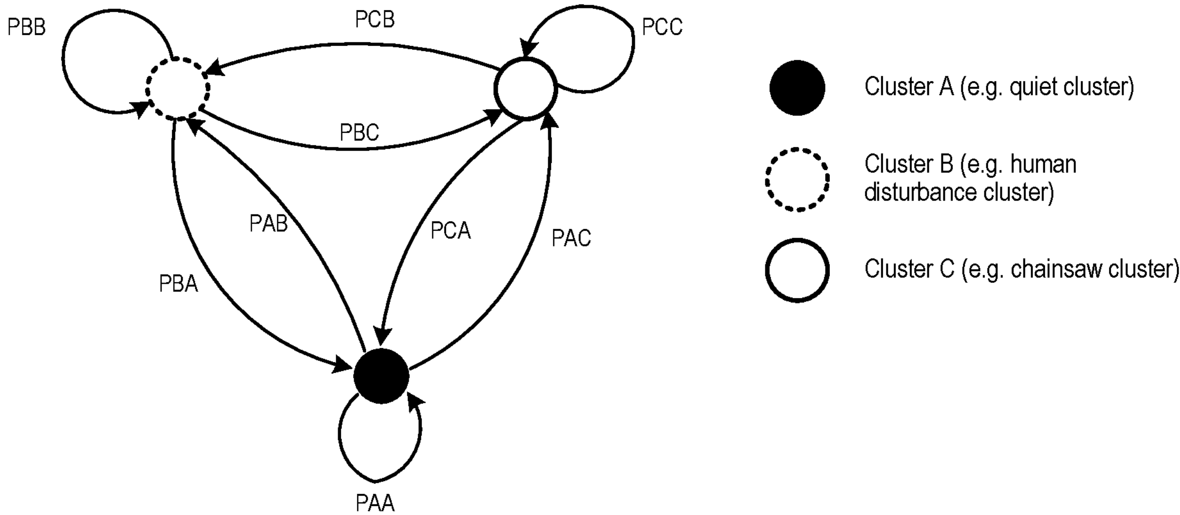
FIG. 14 illustrates an example using discrete-time Markov chain as the stochastic process, in accordance with an example implementation.

Markov chain is a stochastic model that experiences transitions from one state to another according to certain probabilistic rules. FIG. 14 illustrates an example using discrete-time Markov chain as the stochastic process, in accordance with an example implementation. In discrete-time Markov chains, the chain jumps from the current state to the next state after one-unit time.

In the rainforest use case, suppose there are three clusters (A/B/C) where A is the quiet cluster, B is the human disturbance cluster, and C is the chainsaw cluster.

For the single asset, calculate the probability of cluster changes stochastically from history. For example, with three defined clusters, the probability from t1 to t2 has nine combinations, which are:

PAA: the probability of self-transition and stay as cluster A.

PAB: the probability of state changing from cluster A to cluster B.

PAC: the probability of state changing from cluster A to cluster C.

PBB: the probability of self-transition and stay as cluster B.

PBA: the probability of state changing from cluster B to cluster A.

PBC: the probability of state changing from cluster B to cluster C.

PCC: the probability of self-transition and stay as cluster C.

PCA: the probability of state changing from cluster C to cluster A.

PCB: the probability of state changing from cluster C to cluster B.

For a single asset, calculate the lead-time of cluster changes stochastically from history. The same framework in FIG. 14 can be used again while the probabilities will be replaced by lead time. For example, if there are records of t1, t2, t3 with corresponding states as cluster A, cluster A, cluster B. Lead time can be calculated and contributed to LAA (i.e. lead time from cluster A to cluster A) and LAB (i.e. lead time from cluster A to cluster B).

Thus, a continuous-time Markov chain has two components. First, there should be a discrete-time Markov chain which delivers transition probabilities Pij. Second, for each state there is a holding time parameter Lij that controls the amount of time spent in each state.

With transition probabilities Pij and holding time parameter Lij, the stochastic process can be created and generate predictive labels and lead time.

Figure 15:
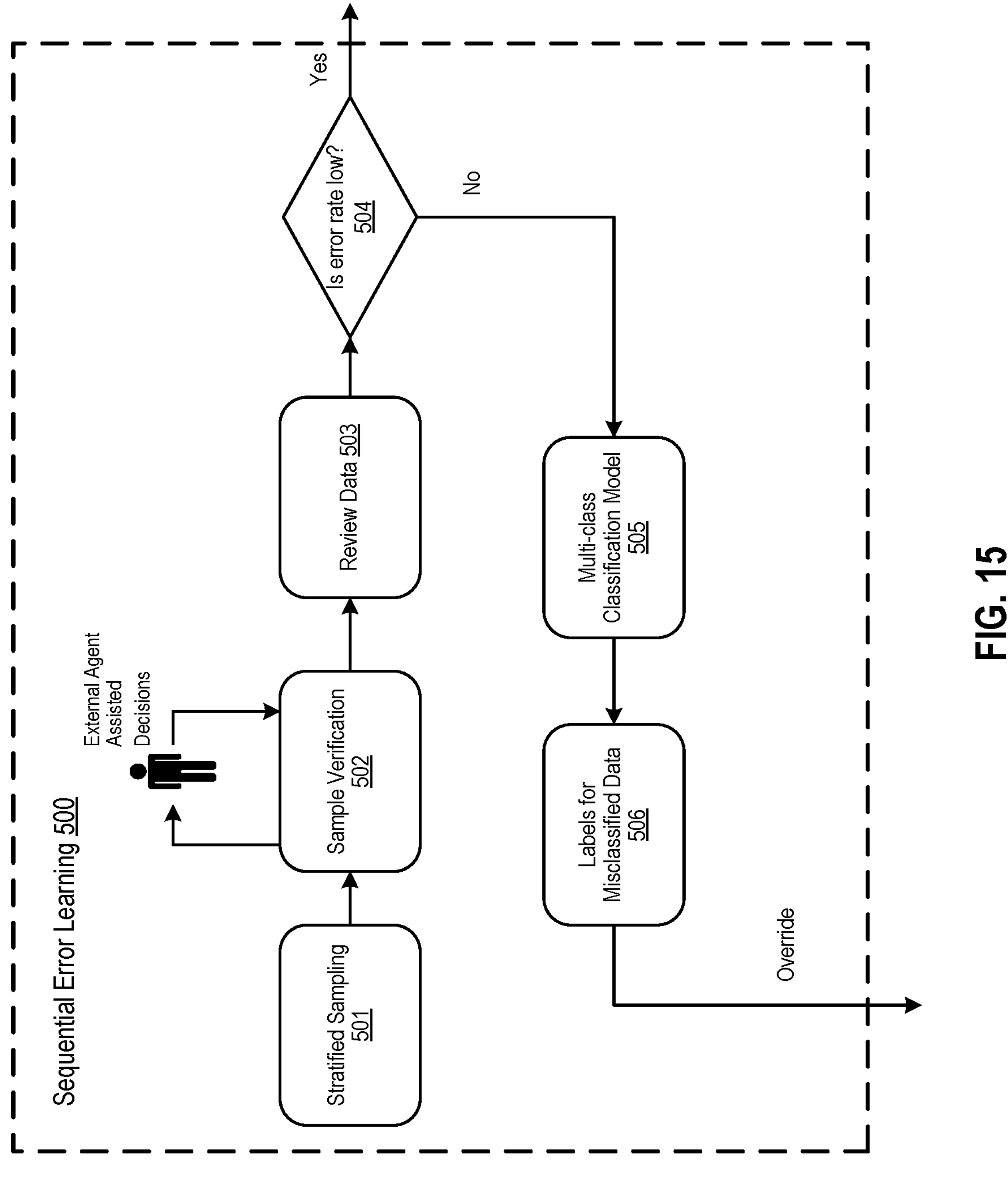
FIG. 15 illustrates an example of sequential error learning, in accordance with an example implementation.

FIG. 15 illustrates an example of sequential error learning 500, in accordance with an example implementation. The fifth stage is to enhance labeling results by creating a self-feedback loop with human-reviewed samples. This stage workflow is shown in FIG. 15. As described herein, the sequential error learning process configured to improve accuracy can involve a self-feedback loop configured to learn errors inherited from a stochastic process and improve pseudo-labels between training phases.

Stratified samples are obtained at 501 based on label percentage. The samples are reviewed and the predicted labels are validated at 502 and 503 (e.g., by a human or other external agent). At 504, if the error rate is lower than the threshold (Yes), then it will continue to the next stage; otherwise if the error rate is equal to or higher than the threshold (No), then a multi-class classification model will be trained to learn the errors at 505. Once the classification model learns about the errors, the pseudo-labels in stage 3 will be overridden with predicted labels from the current stage at 506. The threshold can be set to any level in accordance with the desired implementation.

Due to the self-feedback loop to learn the errors, this stage will consistently improve the label results until the human reviews release it. Therefore, this stage can capture errors which are inherited from stochastic process by human intervention, sequentially correcting and learning errors. In addition, between training phases, it can gradually improve pseudo-labels and model accuracy.

Compared to the related art, this stage is novel because it improves labeling results by building the self-feedback, error-learning system with human-reviewed samples. As a result, this stage will produce a sequential error-learning system. If the error rate is satisfying, it will release labels to the next stage.

Figure 16:
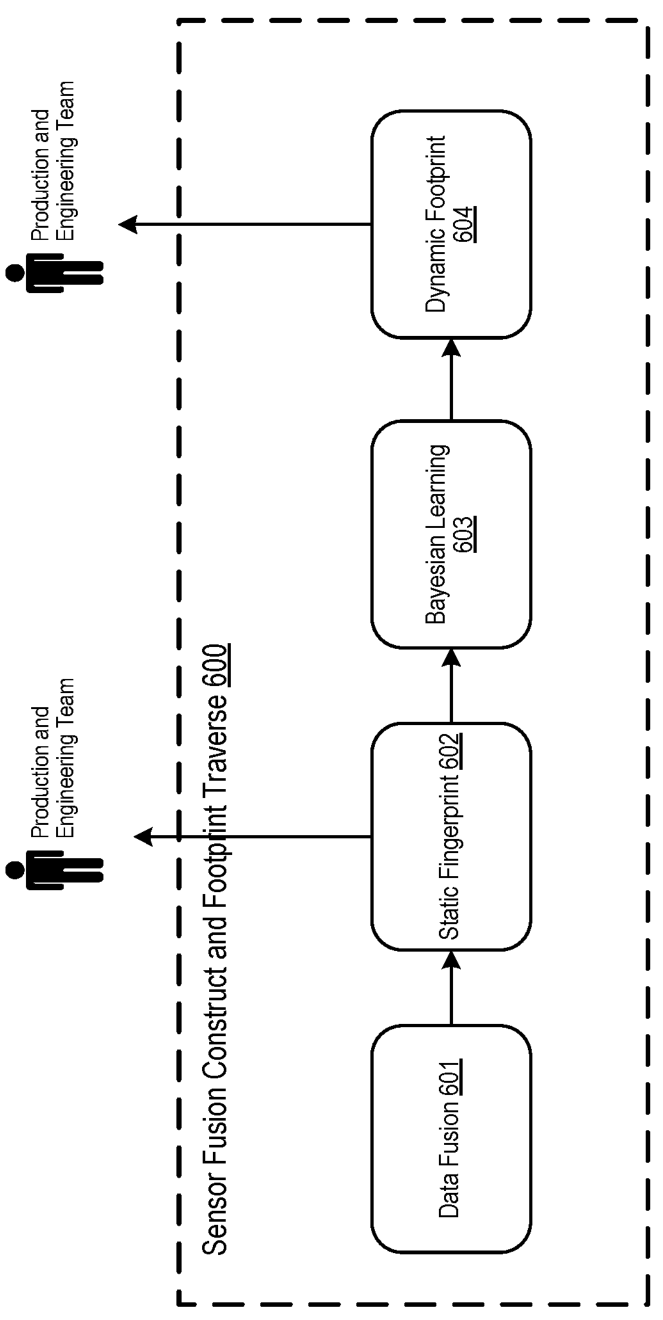
FIG. 16 illustrates an example of the sensor fusion construct and footprint traverse, in accordance with an example implementation.

FIG. 16 illustrates an example of the sensor fusion construct and footprint traverse 600, in accordance with an example implementation. The sixth stage is to predict the anomalous footprint which considers sensor data and/or known properties of the whole environment.

Sensor fusion 601 is the combining and aggregating of sensory data or data derived from sensory data such that the resulting information is better than using the data individually. It provides a system-level status to impute faulty sensor information with sensor cohort or prior temporal information of the fault sensors.

Because sensor fusion 601 uses environment contextual information as well as human and sensor inputs as a priori knowledge and current state, it can improve analytics algorithms with fault tolerance and not rely on specific sensor or group of sensors to determine the analytics outcome. Moreover, sensor fusion 601 provides better liability by cross-reference sensor information and stabilized machine learning algorithms by removing faulty sensor inputs with information from sensor cohort.

FIG. 16 illustrates an example workflow of the sixth stage. Labels, lead times and corresponding metadata are integrated from all single channels. Metadata includes geographical and temporal information. At different times, maps will be created with channel locations and predicted labels from the previous stage for the whole environment. A Bayesian model will be built from Bayesian learning 603 with information gained from other locations across periods. With labels across sensors, priors will be updated with new labels and lead-times. The footprint of anomalous events will be traced at 604. The path of emerging anomalies will be used to identify root causes.

Compared to the related arts, the stage is novel because it can integrate information across sensors via a sensor fusion approach to create fault tolerance models to address the rainforest environment and predict the anomalous footprint by considering sensor data or known properties of the whole environment.

Figure 17:
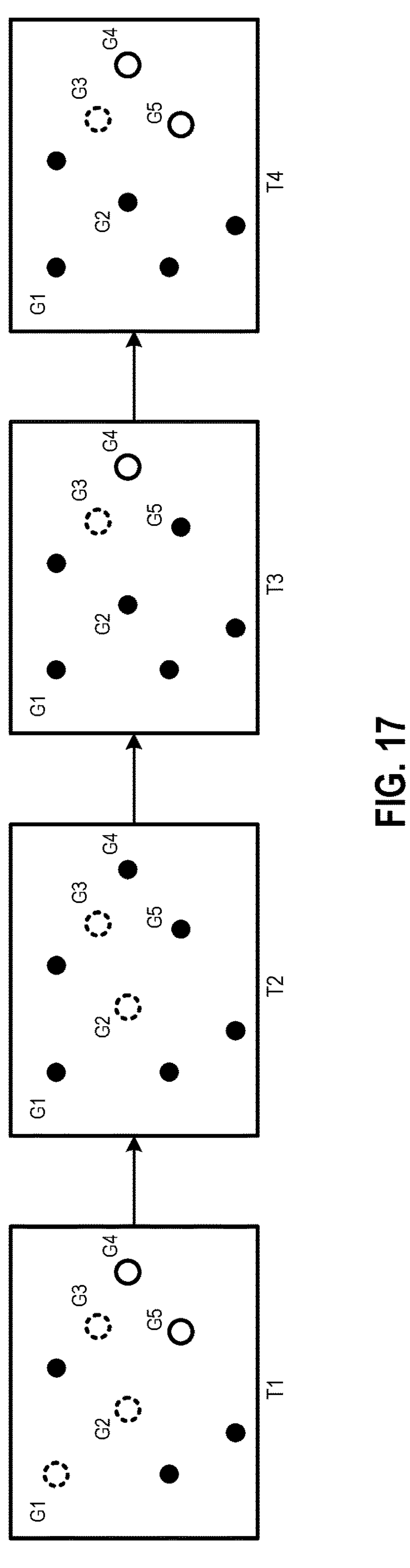
FIGS. 17-18 illustrate examples of mapping a fingerprint and traversing a footprint of illegal logging, in accordance with an example implementation.
Figure 18:
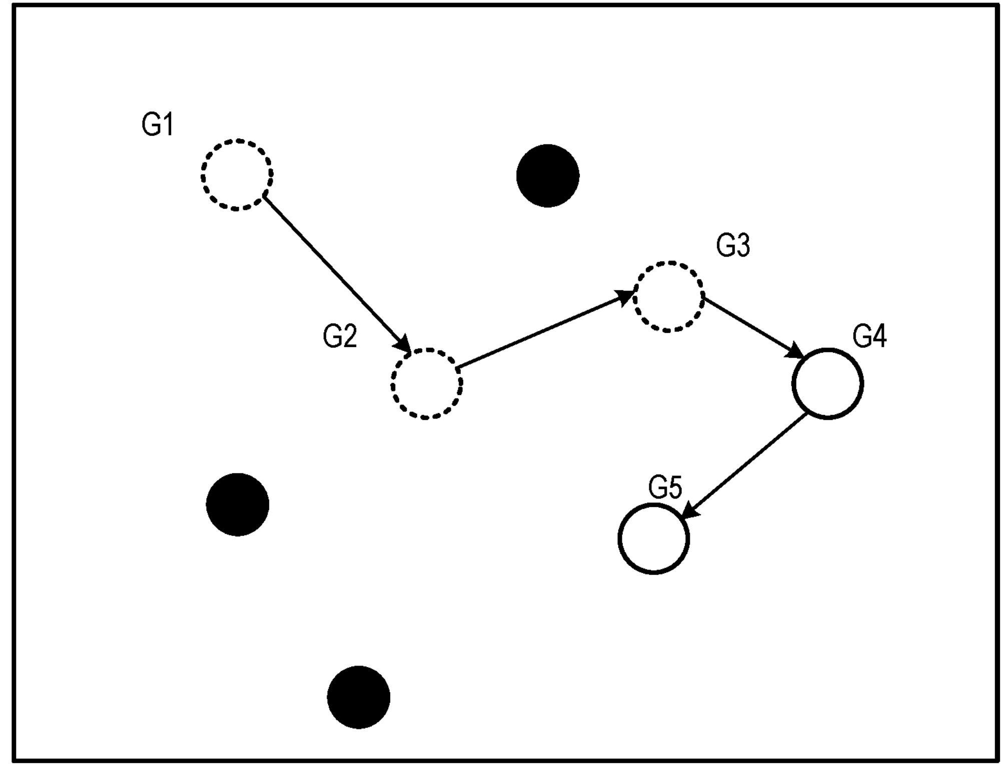

In a rainforest, the stage is combining labels from all guardians across a period to construct a footprint traverse of illegal logging lifecycle. FIGS. 17-18 illustrate examples of mapping a fingerprint and traversing a footprint of illegal logging, in accordance with an example implementation.

To fuse label data and metadata, connections need to be built between predicted labels and metadata.

Suppose:

Gi represents geographical location for guardian i where i=1, 2, . . . , n

Tj represents timestamp y where j=1, 2, . . . , m

Lij represents predicted label or lead-time at guardian Gi at time Tj where i=1, 2, . . . , n and j=1, 2, . . . , m The following connections need to be created:

G1-T1-L11
G1-T2-L12
. . . .
G1-Tm-L1m
G2-T1-L21
G2-T2-L22
. . . .
G2-Tm-L2m
. . . .
Gn-T1-Ln1
Gn-T2-Ln2
. . . .
Gn-Tm-Lnm

Once connections are built, static fingerprints can be created at 602. As the example in FIG. 17, there are four timestamps across guardians. The legend is the same as FIG. 16 in which Filled circle: Quiet stage Dashed circle: Human disturbance stage Solid circle: Chainsaw disturbance stage As time goes on, the predicted labels change as well. At T1, labels in G1 and G2 changed from quiet stage to human disturbance stage which might mean that some loggers entered the forest. At T2, loggers move within the forest where G2 and G3 are in the human disturbance stage while G1 goes back to the quiet stage. At T3, loggers move further and start to cut trees at guardian G4. At T4, the cutting area is expanded and G5 is disturbed as well.

By fusing geographical information, acoustic fingerprints can be constructed. As one outcome of this signature system, the acoustic fingerprint identifies the temporal pattern of acoustic signals based on their perceptual characteristics from single channel.

On the other hand, independent fingerprints are not sufficient in predicting the footprint of illegal logging activities due to two constraints. First, without knowing sequential information from the whole environment, it is not possible to connect guardian states across periods. Second, when some sensors are not available, the prediction of that guardian will not be feasible as well.

In order to solve those issues, a Bayesian network 603 is conducted to predict the footprint. Bayesian network is a probabilistic graphical model that represents a set of variables and their conditional dependencies via a directed acyclic graph (DAG). Bayesian networks are ideal for taking an event that occurred and predicting the likelihood that any one of several possible known causes was the contributing factor. Bayesian network approach includes but are not limited to Dynamic Bayesian Network (DBN) and Hidden Markov Model (HMM).

Therefore, when the state of one guardian is not available, the states of indirect guardians can be used to make up the state of the direct guardian. Using multiple sensors that measure the same quantity can increase robustness and fault tolerance. Additionally, based on sequential guardian states, a traverse pattern of illegal loggers can be identified.

In the example in FIG. 18, a footprint has been created and the probability of G5 labels can be predicted by fusing labels from G1 to G5 across periods.

The dynamic footprint 604 traverse is a crucial output of this system. The traverse pattern is learned through fused data across guardians considering their geographical and temporal metadata. Considering inputs from multiple radars, lidars and cameras as a priori knowledge when constructing model, the traverse footprint provides the most comprehensive, and therefore accurate, environmental model possible. The output can be used as a complete identification of trespassers' motion pattern to enhance investigation.

Another output of this system is an alert notification system. With the footprint traverse predicted, a reliable alert system can be created by setting up threshold on length of human disturbance identified for specific guardians. For example, If G1 and G2 have been experienced significant amount of human disturbance, rangers can direct to G4 and G5 to prevent illegal loggers. It can also avoid alert fatigue by adjust length of human disturbance or number of labels identified as human disturbance stage.

This dynamic footprint traverse can also be helpful to optimize ranger resources across guardians in a rainforest site. A vulnerable scale can be created for guardian(s) according the predicted probabilities of illegal logging. In a guardian with higher vulnerable scale, rangers can allocate more resources or install more guardians to better monitor the area.

Through the example implementations described herein, the dynamic acoustic signature system fuses data to predict the fingerprint and footprint of illegal logging activities. The dynamic acoustic signature system produces reliable and robust predictions using stochastic process, self-feedback error learning, and a sensor fusion process. It can label acoustic signals with limited human intervention and prevent illegal logging by identifying the human disturbance stage.

Example implementations can be applied to public utilities or forest rangers who would like to estimate logger footprint and prevent illegal loggings. In addition, logging prevention can extend to fire prevention. By replacing "chainsaw" with "fire" as the analytics object, the fire footprint can be learned and predicted as well. Moreover, this object in this invention can be extended from illegal loggers to tourists. Locating and rescuing lost tourists will make a significant impact during catastrophes.

Additionally, example implementations described herein can be applied to industrial manufacturing with some minor modifications because machine and product events have signatures (fingerprint and footprint) as well. For example, "Failure footprint in industrial engineering" can be identified to prevent failures in advance and root-cause failure reasons with this approach. The assumption is that a machine or product pattern changing from normal to anomalies should take time and this process can be learned through the system.

The example implementations can be used to determine cascading failures. In an example with a power grid, a failure for a transformer can cause affect another series of transformers that need to take over the load, and also affect people relying on power from the transformer.

Figure 19:
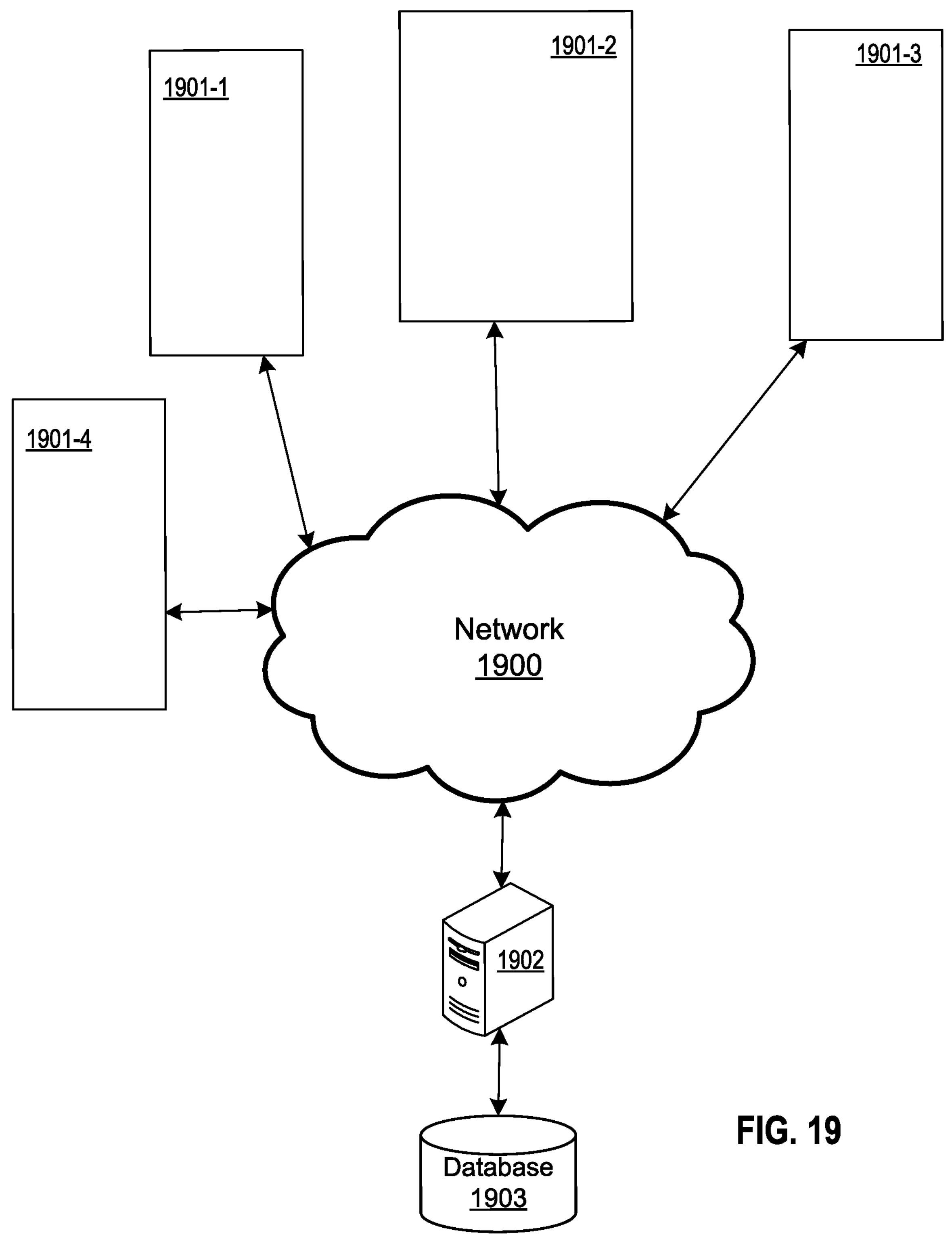
FIG. 19 illustrates a system involving a plurality of systems with connected sensors and a management apparatus, in accordance with an example implementation.

FIG. 19 illustrates a system involving a plurality of systems with connected sensors and a management apparatus, in accordance with an example implementation. One or more sensor systems 1901-1, 1901-2, 1901-3, and 1901-4 are communicatively coupled to a network 1900 which is connected to a management apparatus 1902, which facilitates functionality for an Internet of Things (IoT) gateway or other management system. The management apparatus 1902 manages a database 1903, which contains historical data collected from the sensor systems 1901-1, 1901-2, 1901-3, and 1901-4, which can include labeled data and unlabeled data as received from the systems 1901-1, 1901-2, 1901-3, and 1901-4. In alternate example implementations, the data from the sensor systems 1901-1, 1901-2, 1901-3, 1901-4 can be stored to a central repository or central database such as proprietary databases that intake data such as enterprise resource planning systems, and the management apparatus 1902 can access or retrieve the data from the central repository or central database. Such systems can include remote sensors connected with transmission devices to facilitate communication from forests to the apparatus 1902, sensors attached to manufacturing systems, and so on in accordance with the desired implementation.

Figure 20:
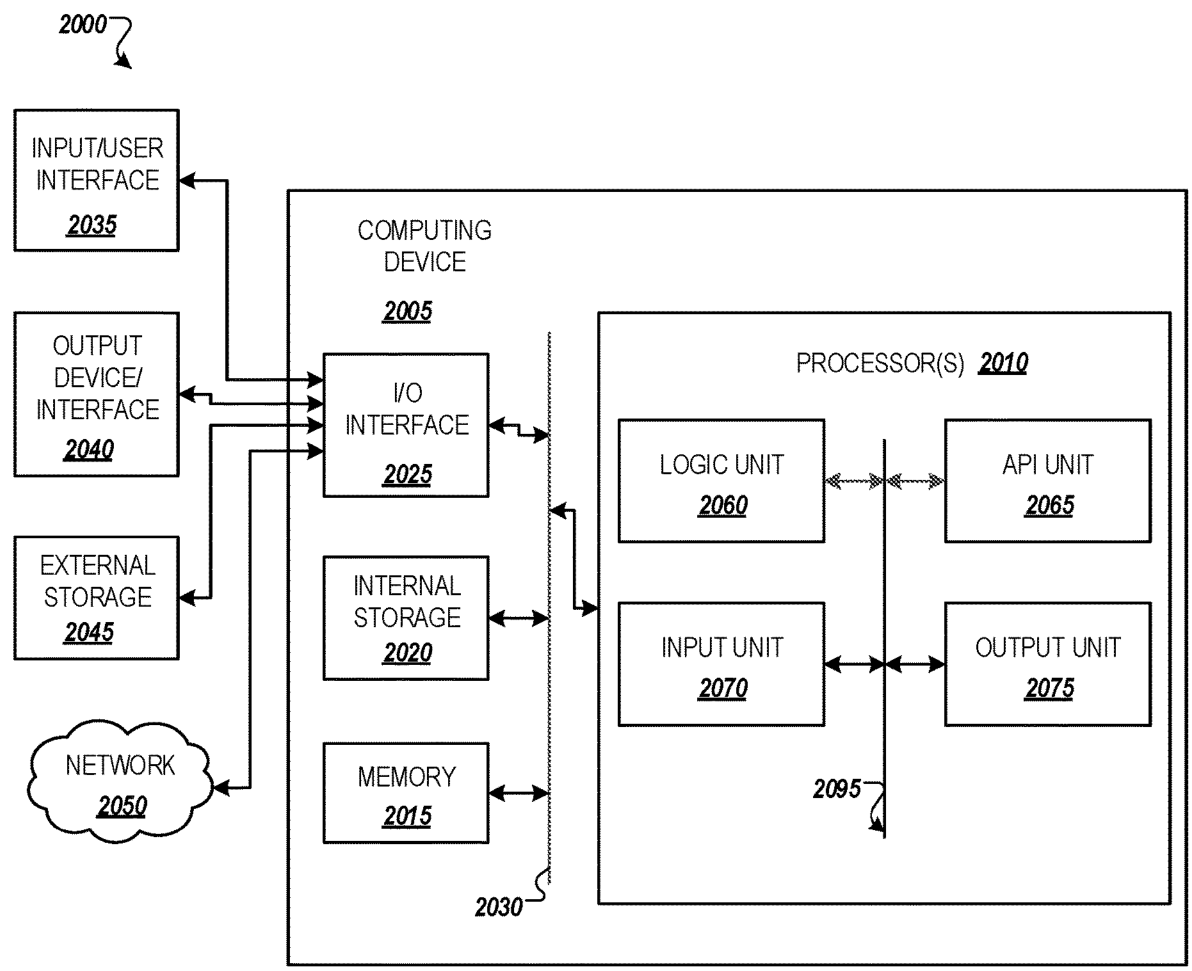
FIG. 20 illustrates an example computing environment with an example computer device suitable for use in some example implementations.

FIG. 20 illustrates an example computing environment with an example computer device suitable for use in some example implementations, such as a management apparatus 1902 as illustrated in FIG. 19.

Computer device 2005 in computing environment 2000 can include one or more processing units, cores, or processors 2010, memory 2015 (e.g., RAM, ROM, and/or the like), internal storage 2020 (e.g., magnetic, optical, solid state storage, and/or organic), and/or I/O interface 2025, any of which can be coupled on a communication mechanism or bus 2030 for communicating information or embedded in the computer device 2005. I/O interface 2025 is also configured to receive images from cameras or provide images to projectors or displays, depending on the desired implementation.

Computer device 2005 can be communicatively coupled to input/user interface 2035 and output device/interface 2040. Either one or both of input/user interface 2035 and output device/interface 2040 can be a wired or wireless interface and can be detachable. Input/user interface 2035 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 2040 may include a display, television, monitor, printer, speaker, braille, or the like. In some example implementations, input/user interface 2035 and output device/interface 2040 can be embedded with or physically coupled to the computer device 2005. In other example implementations, other computer devices may function as or provide the functions of input/user interface 2035 and output device/interface 2040 for a computer device 2005.

Examples of computer device 2005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 2005 can be communicatively coupled (e.g., via I/O interface 2025) to external storage 2045 and network 2050 for communicating with any number of networked components, devices, and systems, including one or more computer devices of the same or different configuration. Computer device 2005 or any connected computer device can be functioning as, providing services of, or referred to as a server, client, thin server, general machine, special-purpose machine, or another label.

I/O interface 2025 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 2000. Network 2050 can be any network or combination of networks (e.g., the Internet, local area network, wide area network, a telephonic network, a cellular network, satellite network, and the like).

Computer device 2005 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 2005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 2010 can execute under any operating system (OS) (not shown), in a native or virtual environment. One or more applications can be deployed that include logic unit 2060, application programming interface (API) unit 2065, input unit 2070, output unit 2075, and inter-unit communication mechanism 2095 for the different units to communicate with each other, with the OS, and with other applications (not shown). The described units and elements can be varied in design, function, configuration, or implementation and are not limited to the descriptions provided.

In some example implementations, when information or an execution instruction is received by API unit 2065, it may be communicated to one or more other units (e.g., logic unit 2060, input unit 2070, output unit 2075). In some instances, logic unit 2060 may be configured to control the information flow among the units and direct the services provided by API unit 2065, input unit 2070, output unit 2075, in some example implementations described above. For example, the flow of one or more processes or implementations may be controlled by logic unit 2060 alone or in conjunction with API unit 2065. The input unit 2070 may be configured to obtain input for the calculations described in the example implementations, and the output unit 2075 may be configured to provide output based on the calculations described in example implementations.

Processor(s) 2010 can be configured to identify and label patterns based on characteristics of sensor data streamed from one or more sensors in a network of sensors as illustrated, for example, in FIGS. 2, 6, and 8; process the identified and labeled patterns to estimate a probability and a lead time for a change to an area associated with the one or more sensors from a current sensor stage to another sensor stage, the processing the identified and labeled patterns involving a sequential error learning process configured to improve accuracy as illustrated in FIGS. 13-15; and determine, for neighboring sensors to the one or more sensors in the network of sensors, a probability of a sensor stage change for other areas associated with the neighboring sensors as illustrated in FIG. 16.

Processor(s) 2010 can be configured to identify and label the patterns based on the characteristics of the sensor data streamed from the one or more sensors in the network by converting acoustic data in the streamed sensor data from time domain to frequency domain; deriving frequency domain features from the converted acoustic signals; applying dimension reduction to the frequency domain features; clustering the dimension reduced frequency domain features; and applying fingerprint analysis to identify sensor stages as illustrated in FIGS. 6-8.

Processor(s) 2010 can be configured to apply the fingerprint analysis to identify the sensor stages by identifying signal fingerprints from background noise; identifying antecedent indicators for anomalous events; and analyzing an event association between anomalies and their sequence through frequency band distributions and image classification as illustrated in FIGS. 8-12.

Processor(s) 2010 can be configured to identify and label patterns based on the characteristics of the sensor data streamed from the one or more sensors in the network of sensors by synthesizing data to augment the sensor data; the synthesizing data involving extracting signal features from the separated noise signal and the target signal to replicate anomalous signal and the noise signal; combining the replicated anomalous signal and the noise signal through super imposing to form synthesized data; and validating the synthesized data as illustrated in FIG. 4.

Processor(s) 2010 can be configured to identify and label the patterns based on the characteristics of the sensor data streamed from the one or more sensors in the network of sensors by executing outlier removal on the sensor data based on metadata learning of audios and images as illustrated in FIG. 5.

Processor(s) 2010 can be configured to process the identified and labeled patterns to estimate the probability and the lead time for a change to the area associated with the one or more sensors from the current stage to the another stage through a stochastic process trained with temporal patterns to output the probability and the lead time for all types of labeled sensor stages as illustrated in FIGS. 13-14.

Depending on the desired implementation, the sequential error learning process configured to improve accuracy can involve a self-feedback loop configured to learn errors inherited from a stochastic process and improve pseudo-labels between training phases Processor(s) 2010 can be configured to determine, for the neighboring sensors to the one or more sensors in the network of sensors, the probability of the sensor stage change for other areas associated with the neighboring sensors based on a Bayesian learning model configured to determine the probability of the sensor stage change for the other areas and an estimated time of occurrence based on the fused fingerprint labels with geographical and temporal information from the neighboring sensors in the network of sensors as illustrated in FIGS. 16 and 17.

Processor(s) 2010 is configured to determine, for the neighboring sensors to the one or more sensors in the network of sensors, the probability of the sensor stage change for the other areas associated with the neighboring sensors by generating a dynamic footprint comprising ones of the network of sensors having the probability of the sensor stage change, wherein the dynamic footprint provides a visualization of the ones of the network of sensors undergoing the state change in temporal order over time as illustrated in FIG. 18.

Depending on the desired implementation, the sensor stages (e.g., the current sensor stage, the another sensor stage) can be one of a human disturbance, a dense chainsaw, a light chainsaw, or a quiet time as illustrated in FIG. 16.

Example implementations can also be extended for determining other stage changes depending on the desired implementation (e.g., as applied to a factory setting or other IoT setting). In such an example implementation, processor(s) 2010 can be configured to detecting a first event from sensor data streamed from one or more sensors in a network of sensors; processing the first event to determine a probability of a second event and an estimated lead time for the second event for an area associated with the one or more sensors; and determine, for neighboring sensors to the one or more sensors in the network of sensors, a probability of a change of state to the first event or the second event for other areas associated with the neighboring sensors. The stage change can be any kind of failure state in accordance with the desired implementation, and the stage change for neighboring sensors can thereby be utilized to detect a cascading failure event.

In an example of such an implementation for detecting other changes of states to determine a cascade failure, one example can involve a power grid with multiple transformers. When a transformer is fully loaded and fails, then other neighboring transformers need to handle the additional load to support the power grid. However, if such a load also causes failure in the neighboring transformers, then a cascading failure event can thereby occur in which the failure of one transformer causes the failure of other neighboring transformers in a sequence.

Thus, example implementations can be utilized to determine if there is an initial cascade failure in the fingerprint analysis, from which the system can be immediately shut down to prevent the cascading failure.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method comprising:

identifying and labeling patterns based on characteristics of sensor data streamed from one or more sensors in a network of sensors, wherein the identifying and labeling the patterns based on the characteristics of the sensor data streamed from the one or more sensors in the network comprises:

converting acoustic data in the streamed sensor data from time domain to frequency domain;

deriving frequency domain features from the converted acoustic signals;

applying dimension reduction to the frequency domain features;

clustering the dimension reduced frequency domain features; and applying fingerprint analysis to identify sensor stages;

processing the identified and labeled patterns to estimate a probability and a lead time for a change to an area associated with the one or more sensors from a current sensor stage to another sensor stage, the processing the identified and labeled patterns comprising a sequential error learning process configured to improve accuracy; and determining, for neighboring sensors to the one or more sensors in the network of sensors, a probability of a sensor stage change for other areas associated with the neighboring sensors.

2. The method of claim 1, wherein the applying the fingerprint analysis to identify the sensor stages comprises:

identifying signal fingerprints from background noise;

identifying antecedent indicators for anomalous events; and analyzing an event association between anomalies and their sequence through frequency band distributions and image classification.

3. The method of claim 1, wherein the identifying and labeling patterns based on the characteristics of the sensor data streamed from the one or more sensors in the network of sensors further comprises synthesizing data to augment the sensor data; the synthesizing data comprising:

extracting signal features from a separated noise signal and a target signal to replicate anomalous signal and the noise signal;

combining the replicated anomalous signal and the noise signal through super imposing to form synthesized data; and validating the synthesized data.

4. The method of claim 1, wherein the identifying and labeling the patterns based on the characteristics of the sensor data streamed from the one or more sensors in the network of sensors comprises executing outlier removal on the sensor data based on metadata learning of audios and images.

5. The method of claim 1, wherein the processing the identified and labeled patterns to estimate the probability and the lead time for a change to the area associated with the one or more sensors from the current stage to another stage is conducted through a stochastic process trained with temporal patterns to output the probability and the lead time for all types of labeled sensor stages.

6. The method of claim 1, wherein the sequential error learning process configured to improve accuracy comprises a self-feedback loop configured to learn errors inherited from a stochastic process and improve pseudo-labels between training phases.

7. The method of claim 1, wherein the determining, for the neighboring sensors to the one or more sensors in the network of sensors, the probability of the sensor stage change for other areas associated with the neighboring sensors is based on a Bayesian learning model configured to determine the probability of the sensor stage change for the other areas and an estimated time of occurrence based on a fused fingerprint labels with geographical and temporal information from the neighboring sensors in the network of sensors.

8. The method of claim 1, wherein the determining, for the neighboring sensors to the one or more sensors in the network of sensors, the probability of the sensor stage change for the other areas associated with the neighboring sensors further comprises generating a dynamic footprint comprising ones of the network of sensors having the probability of a sensor stage change, and wherein the dynamic footprint provides a visualization of the ones of the network of sensors undergoing the state change in temporal order over time.

9. The method of claim 1, wherein each of the current sensor stage and the another sensor stage is one of a human disturbance, a dense chainsaw, a light chainsaw, or a quiet time.

10. A non-transitory computer readable medium, storing instructions for executing a process, the instructions comprising:

identifying and labeling patterns based on characteristics of sensor data streamed from one or more sensors in a network of sensors, wherein the identifying and labeling the patterns based on the characteristics of the sensor data streamed from the one or more sensors in the network comprises:

converting acoustic data in the streamed sensor data from time domain to frequency domain;

deriving frequency domain features from the converted acoustic signals;

applying dimension reduction to the frequency domain features;

clustering the dimension reduced frequency domain features; and applying fingerprint analysis to identify sensor stages;

processing the identified and labeled patterns to estimate a probability and a lead time for a change to an area associated with the one or more sensors from a current sensor stage to another sensor stage, the processing the identified and labeled patterns comprising a sequential error learning process configured to improve accuracy; and determining, for neighboring sensors to the one or more sensors in the network of sensors, a probability of a sensor stage change for other areas associated with the neighboring sensors.

11. An apparatus, comprising:

a processor, configured to:

identify and label patterns based on characteristics of sensor data streamed from one or more sensors in a network of sensors, wherein the identifying and labeling the patterns based on the characteristics of the sensor data streamed from the one or more sensors in the network comprises:

converting acoustic data in the streamed sensor data from time domain to frequency domain;

deriving frequency domain features from the converted acoustic signals;

applying dimension reduction to the frequency domain features;

clustering the dimension reduced frequency domain features; and applying fingerprint analysis to identify sensor stages;

process the identified and labeled patterns to estimate a probability and a lead time for a change to an area associated with the one or more sensors from a current sensor stage to another sensor stage, the processing the identified and labeled patterns comprising a sequential error learning process configured to improve accuracy; and determine, for neighboring sensors to the one or more sensors in the network of sensors, a probability of a sensor stage change for other areas associated with the neighboring sensors.

* * * * *